United States Patent [19]

McKinley

[11] Patent Number: 5,715,345
[45] Date of Patent: Feb. 3, 1998

[54] OPTICAL BEAM REGENERATION BY OPTICAL FIBER REMAPPING

[75] Inventor: William G. McKinley, Littleton, Mass.

[73] Assignee: Hughes Danbury Optical Systems, Inc., Danbury, Conn.

[21] Appl. No.: 394,474

[22] Filed: Feb. 27, 1995

[51] Int. Cl.$^6$ .................................................. G02B 6/04
[52] U.S. Cl. .............................. 385/115; 385/116; 385/12; 385/121; 356/124; 250/227.2
[58] Field of Search ........................ 385/115–121, 901; 356/124; 250/227.2

[56] References Cited

U.S. PATENT DOCUMENTS

| | | | |
|---|---|---|---|
| 3,523,732 | 8/1970 | Mary | 356/4 |
| 3,663,087 | 5/1972 | Guillet et al. | 350/150 |
| 4,185,888 | 1/1980 | Quelle, Jr. | 385/115 |
| 4,475,027 | 10/1984 | Pressley | 219/121 |
| 4,744,615 | 5/1988 | Fan et al. | 350/96.1 |
| 4,793,694 | 12/1988 | Liu | 350/379 |
| 5,224,200 | 6/1993 | Rasmussen et al. | 385/146 |
| 5,515,470 | 5/1996 | Eikelmann et al. | 356/124 |
| 5,553,184 | 9/1996 | Eikelmann et al. | 385/115 |

FOREIGN PATENT DOCUMENTS

| | | |
|---|---|---|
| 0 230 931 | 8/1987 | European Pat. Off. . |
| 40 42 317 A1 | 7/1992 | Germany . |
| 63-208821 | 8/1988 | Japan . |

OTHER PUBLICATIONS

D'yakonov, et al., "Method for enhancement of the spatial homogeneity of laser radiation using polarization coupling out of radiation," *Sov. J. Quantum Electron*, 20(4), 387–388 (Apr. 1990).

Wagner, et al., "Formation of p-n Junctions and Silicides in Silicon using a high performance laser beam homogenization system," *Applied Surface Science*, 43 (1989):260–263 (1989) No Month.

Harte, et al., "Excimer laser light delivery system for micromachining," *SPIE O-E Fiber Lase*, (Sep. 6–10 1988).

Bunis, et al., "Producing a uniform excimer laser beam for materials processing applications," *SPIE, 1377* Excimer Laser Materials Processing and Beam Delivery Systems, 30–36 (1990).

*Primary Examiner*—Phan T. H. Palmer
*Attorney, Agent, or Firm*—W. C. Schubert; W. K. Denson-Low

[57] ABSTRACT

An optical beam regenerator includes a plurality of optical fibers into which an input beam is directed. The optical fibers are positioned to rearrange portions of the input beam to generate an output beam having a uniform or other prescribed distribution of irradiance. To further smooth the irradiance distribution of the output beam, the beam can be directed through a Köhler illumination system.

14 Claims, 5 Drawing Sheets

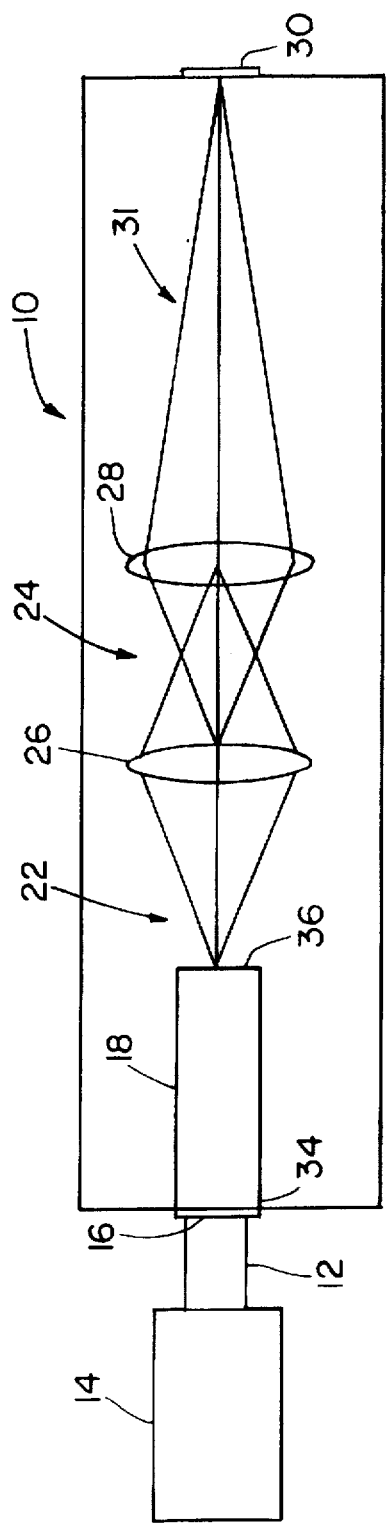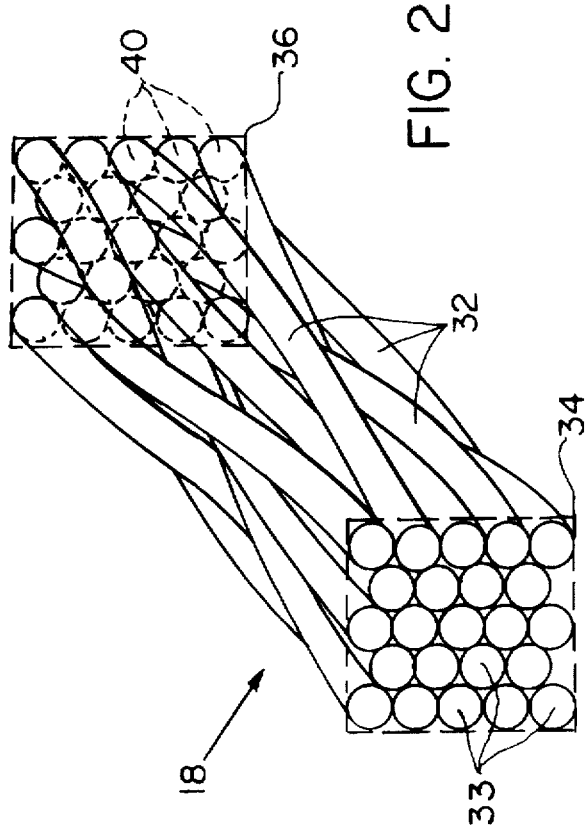

OPTICAL BEAM REGENERATION BY OPTICAL FIBER REMAPPING

BACKGROUND OF THE INVENTION

Numerous systems utilize optical beams as the source of illumination or radiation for photolithography, image mask projection, laser ablation and other processes. These systems often require prescribed irradiance or intensity distributions, usually uniform, to achieve optimum performance. The nature of laser sources however is that the cross-sectional irradiance or intensity of the output laser beam is generally nonuniform. The consequence of this is that the processes which utilize the beam can produce unsatisfactory results. For example, material may be unevenly ablated, or, in photolithographic processes, photosensitive materials may be unevenly exposed. Also, because the optical power distribution in the beam is non-uniform, power is not efficiently delivered where it is needed. Substantial power loss can result.

SUMMARY OF THE INVENTION

The present invention is directed to an apparatus and method for generating an optical beam, such as a laser beam, which has a predetermined cross-sectional irradiance distribution or profile. The apparatus includes an input aperture through which an input beam having an input cross-sectional irradiance or intensity profile enters the device. The device also includes an output aperture through which a regenerated output beam exits the device, the output beam having a predetermined prescribed cross-sectional irradiance profile. Between the input and output apertures, the device includes a plurality of optical fibers, each of which carries a portion of the input beam. Via a predetermined ordered arrangement, the fibers map each portion of the input beam to a corresponding portion of the output beam. The optical fiber ends are positioned to rearrange the portions of the input beam such that the output beam has the prescribed cross-sectional irradiance profile.

In one embodiment, the input beam is remapped by the optical fibers to homogenize the beam. That is, the predetermined prescribed irradiance profile calls for an output beam having a more uniform irradiance profile than that of the input beam.

The arrangement of the optical fibers is selected based on the irradiance profiles of the input beam and output beam. Different types of lasers produce beams having different irradiance profiles. For example, argon and helium-neon lasers produce circularly exponential profiles in which the intensity is at its highest point at the center of the beam and exponentially decays radially from the center in all directions. This known profile of the laser output is used to define the fiber arrangement required to change the profile to the predetermined output beam profile prescribed for the intended application. In one embodiment, the arrangement of the optical fibers is chosen to remap portions of the exponential beam to an output beam having a more spatially uniform intensity distribution. To that end, in general, the high intensity portions of the laser beam near its center are mapped to positions adjacent to lower intensity portions taken from the laser beam's perimeter.

Other types of lasers such as Transversely Excited Amplifier (TEA) lasers, including $CO_2$ and UV excimer lasers, exhibit different intensity profiles in different orthogonal directions. That is, they exhibit an exponential profile in the vertical direction while, in the horizontal direction, the profile is flat with steep ramp decays at the far edges of the beam. In this type of beam, a different remapping would be required to produce a homogenized beam. Consequently, a different arrangement of the optical fibers is used.

It will be understood that the beam remapping apparatus and method of the invention are applicable to an optical beam having any repeatable cross-sectional irradiance profile. Each profile can be associated with a corresponding remapping order to produce an output beam having a predetermined irradiance profile.

In one embodiment, the output beam is taken from the output ends of the optical fibers. The discrete portions of the input beam are remapped into the output beam such that the output beam consists of multiple contiguous discrete portions of the input beam. The irradiance profile of the output beam therefore consists of multiple discrete steps in irradiance. In another embodiment, smoothing of the output irradiance profile is provided by an illumination system. In the preferred embodiment, the illumination system is a projection condenser system, commonly known as a Köhler illumination system.

The remapping order is determined by selecting an optimum output arrangement of fibers so that the irradiance distribution at the output of the fibers or the condenser aperture of the Köhler illumination system is as desired, for example, uniform. The remapping can even be defined to compensate for $cos^4$ fall-off exhibited by most optical systems by remapping with higher irradiance at the outer perimeter of the fiber bundle. The determination of the optimum remapping can be done by inspection or by computer, based upon the output desired and the input irradiance distribution of the laser. The free parameter that allows an arbitrary accuracy to be achieved in the desired performance is the number of fibers used. As the number of fibers increases, so does the accuracy to which a desired output can be produced.

The device and method of the invention can be made highly efficient. In one embodiment, the plurality of optical fibers are closely packed in a fiber optic bundle, and, preferably, the bundle is hexagonally packed to optimize the efficiency of the system. The bundle may also be packed in a cartesian array. The fibers are unclad and can be either bare or coated to allow efficient capture of energy when closely packed. Capture efficiency can exceed 90% under these conditions. The ends of the fiber bundles can be heated and squeezed causing the fibers to flow and fill in the packing gaps or, alternatively, fibers with shaped ends can be used to fit the packing array and eliminate gaps in the fiber bundle to increase the capture efficiency.

As a beam homogenizer, the invention provides numerous advantages over prior beam homogenizing devices. Prior devices typically split the nonuniform beam into plural beam sections with an optical element such as a segmented lens. In such devices, each beam section is directed to an output aperture where the sections overlap to produce a more uniform beam. The prior systems do not remap the sections according to the particular unique irradiance profile of the beam being homogenized. They simply direct the individual sections of the input beam to the output regardless of the profile of the input to provide a coarsely homogenized output beam. In contrast, the present invention provides a logically ordered remapping of minute portions of the input beam according to the particular irradiance profile of the input beam. Each individual portion of the input beam is placed at a location in the output beam according to its intensity. This selective remapping results in a much more precisely controlled customized irradiance distribution in the output beam.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 1 is a schematic block diagram of an embodiment of the present invention.

FIG. 2 is a schematic perspective view of the fiber optic remapper of the present invention.

DETAILED DESCRIPTION OF THE INVENTION

Figure 3:
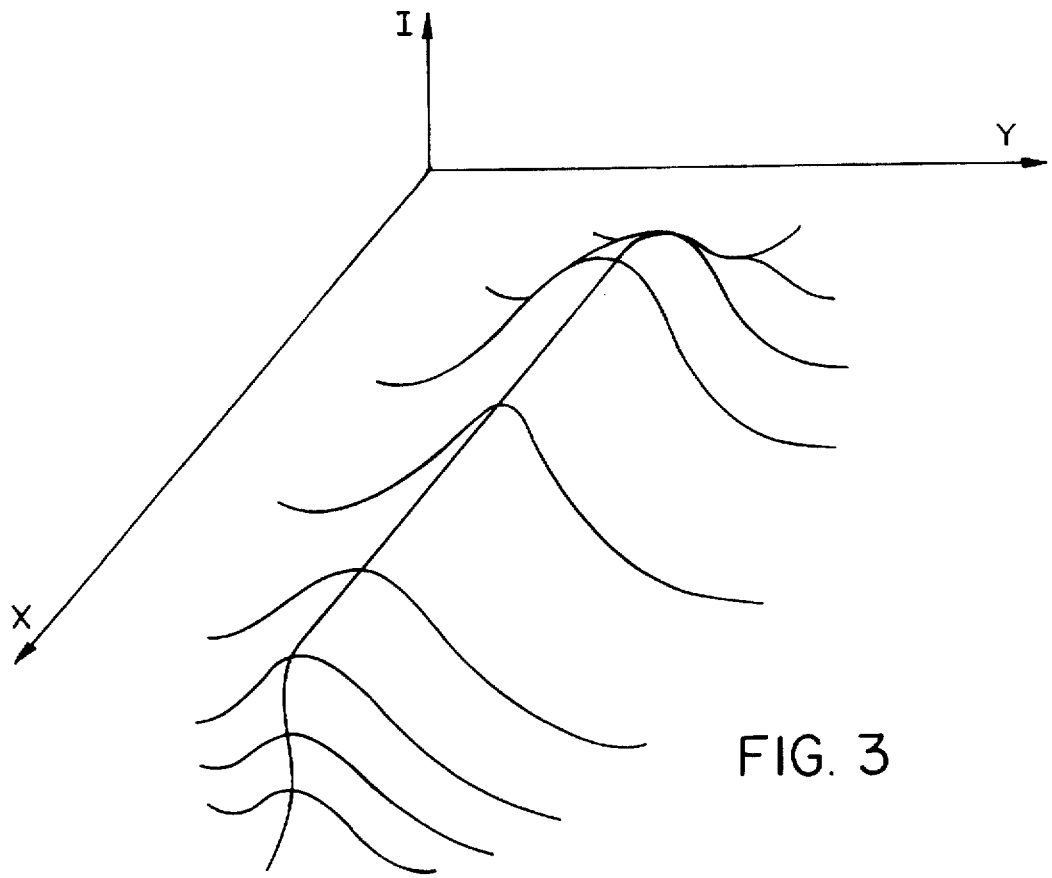
FIG. 3 is a three-dimensional plot of an irradiance profile of a laser output beam.

FIG. 1 is a schematic block diagram of one embodiment of the optical beam regenerator 10 of the invention. A light beam 12 having an input cross-sectional irradiance profile from a light source such as laser 14 enters the device 10 through an entrance aperture 16. After passing through the aperture 16, the light enters the input end 34 of a fiber optic remapper 18 comprising a plurality of optical fibers. Input ends of the fibers are arranged in a two-dimensional array to receive the beam of light and divide the beam into multiple portions, with each fiber carrying a single portion of the beam. Output ends of the optical fibers are arranged in a second two-dimensional array at the output end 36 of the fiber optic remapper 18 such that, at the output of the remapper 18, the portions of the input beam carried by the fibers are brought back together in a remapped beam 22 emitted from the remapper 18.

The plurality of fibers are arranged within the remapper 18 to control the mapping of each portion of the input beam to a portion of the remapped beam 22 emitted from the remapper. The arrangement of the fibers is based on the cross-sectional irradiance profile of the input beam and the prescribed cross-sectional irradiance profile of the output beam. Based on both profiles, the fibers are positioned to provide an output beam with the desired irradiance profile. In one embodiment, the device 10 is used as a laser beam homogenizer. In that embodiment, the fibers are positioned to provide an output beam having a uniform cross-sectional irradiance profile.

In the embodiment of FIG. 1, the irradiance distribution of the remapped beam 22 is further smoothed by a condenser projection system or Köhler illumination system 24. The illumination system 24 includes a condenser lens 26 followed by a projection lens 28. The condenser lens 26 creates an image of the output end 36 of the remapper 18 at the pupil of the projection lens 28 so that the projection lens aperture has substantially the same irradiance as the light at the output end of the remapper 18. This minimizes loss of light while smoothing the remapped beam 22. The projection lens 28 creates an image of the back of the condenser lens 26 at an output aperture 30 of the homogenizer 10. The resulting output beam 31 has a smoothed irradiance profile and includes nearly all of the optical power in the original laser beam. Minimal losses occur due to the slight spacing between the fibers and the propagation losses in the fibers and the illumination system 24. The overall optical efficiency of the entire system has been estimated at 0.803.

FIG. 2 is a schematic block diagram of the fiber optic remapper 18 of the present invention. The remapper 18 comprises a plurality of optical fibers 32 which extend from the input end 34 to the output end 36 of the remapper 18. At the input end 34, input ends 33 of the fibers 32 are arranged in a two-dimensional array. In the embodiment shown, the fibers 32 are hexagonally packed, i.e., each fiber is surrounded by six other fibers. The output ends 40 of the fibers 32 are arranged in a second two-dimensional array at the output end 36 of the remapper 18. In addition to being hexagonally packed, the ends 33 and 40 of the fibers 32 can also be heated and slightly squeezed together. This optimizes light throughput to maintain efficiency of the system.

Within the remapper 18, each fiber 32 is routed from a position in the two-dimensional input array to a position in the two-dimensional output array. The routing for the fibers 32 is determined by the irradiance profile of the input beam and the desired irradiance profile of the output beam, and, specifically, the routing of each fiber 32 is determined by the intensity of the portion of the input beam carried by that fiber. Each output fiber end 40 is placed at a position in the output array according to the intensity of the light it carries such that, when the individual contributions of all of the fibers are combined at the output, the predetermined output profile results. In the homogenizer embodiment, the fiber ends 40 are located such that the combined light out of the fiber ends results in the most uniform possible remapped beam 22 at the output end 36 of the remapper 18.

The arrangement of fibers shown in FIG. 2 is intended as a general illustration only. It is not intended to depict any particular remapping associated with a particular input beam irradiance profile or output beam irradiance profile.

In general, each different type of laser outputs a beam having a unique cross-sectional irradiance profile. For example, Transversely Excited Amplifier (TEA) lasers output a beam which has an exponential or "gaussian-like" distribution in one dimension and a flat distribution in the orthogonal dimension with steep ramp decays at opposite ends of the distribution. These lasers include $CO_2$ and UV excimer lasers. FIG. 3 is a schematic three-dimensional plot which shows this type of irradiance profile. As shown, the profile has a flat or slightly ramped distribution in the x dimension and an exponential or gaussian-like distribution in the y dimension.

Figure 4:
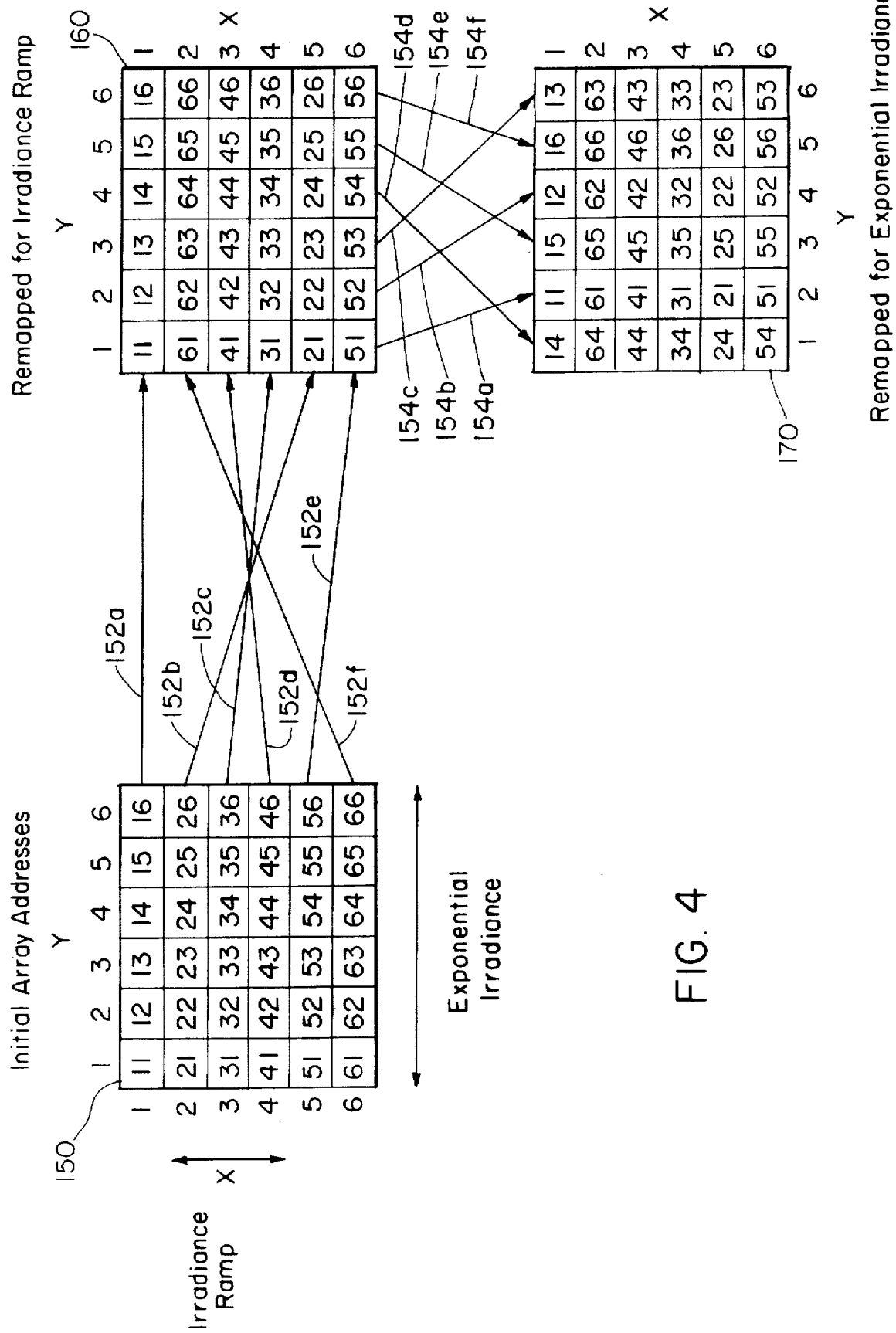
FIG. 4 is a schematic representation of a remapping order used to homogenize the beam of FIG. 3.

FIG. 4 shows a preferred cartesian remapping order used to homogenize the beam of FIG. 3. Grid 150 shows the addresses of the input ends of the fibers in the two-dimensional input array at the input end of the remapper 18. In the illustration shown, the two-dimensional input array consists of six rows and six columns, labelled 1 through 6. It will be understood that more or fewer fibers, usually more, can be used as desired. Also, other packing schemes such as hexagonal packing can be used.

The two-digit number in each box of grid 150 represents the row-column address in the two-dimensional input array of the input end of the corresponding fiber, with the first digit representing the row number and the second digit representing the column number. For example, the box labelled "34" represents the fiber whose input end is located in the third row and fourth column of the input array. The rows of the array are arranged along the x dimension in which the input beam exhibits a ramp profile; and the columns of the array are arranged along the y dimension in which the profile is exponential. Therefore, to homogenize this particular input beam, the final remapping of the beam is achieved by rearranging the rows to smooth the irradiance ramp and rearranging the columns to smooth the exponential distribution.

The arrows 152a–152f and grid 160 show how the rows of addresses are rearranged by the fibers to account for the irradiance ramp distribution in the x dimension. For example, arrow 152c indicates that the third row of fiber input ends is mapped to the fourth row of fiber output ends in the two-dimensional output array. Arrows 154a–154f and grid 170 show how the columns of the input array are rearranged to account for the exponential irradiance distribution in the y dimension. For example, arrow 154e shows that the fifth column of fiber input ends is mapped to the third column of fiber output ends in the two-dimensional output array.

Grid 170 shows the complete remapping of the input array to the output array. It shows the locations in the output array of the addresses of the fiber input ends. For example, the fiber whose input end is located in the fifth row and second column of the input array, i.e., address 52, has its output end located in the sixth row and fourth column of the output array. The resulting remapped homogenized output beam has an irradiance profile more uniform than the input beam profile shown in FIG. 3.

Figure 5:
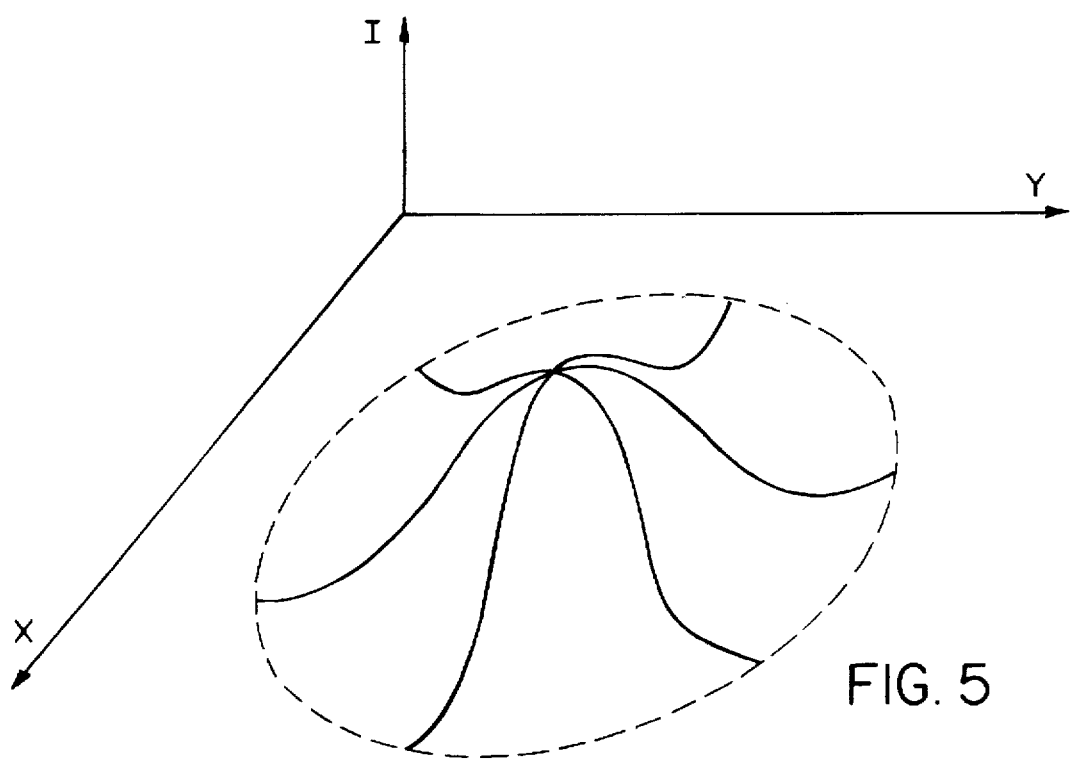
FIG. 5 is a three-dimensional plot of an irradiance profile of a second type of laser output beam.

FIG. 5 is a three-dimensional plot of a circularly exponential or gaussian-like irradiance profile produced by some lasers, including helium-neon lasers and argon lasers. The helium-neon laser produces a true gaussian distribution, while other lasers produce gaussian-like exponential distributions. As shown in FIG. 5, such a laser has a bright spot at the center of its beam (shown as the peak in the plot), and the intensity of the beam falls off exponentially in all radial directions from the center.

Figure 6:
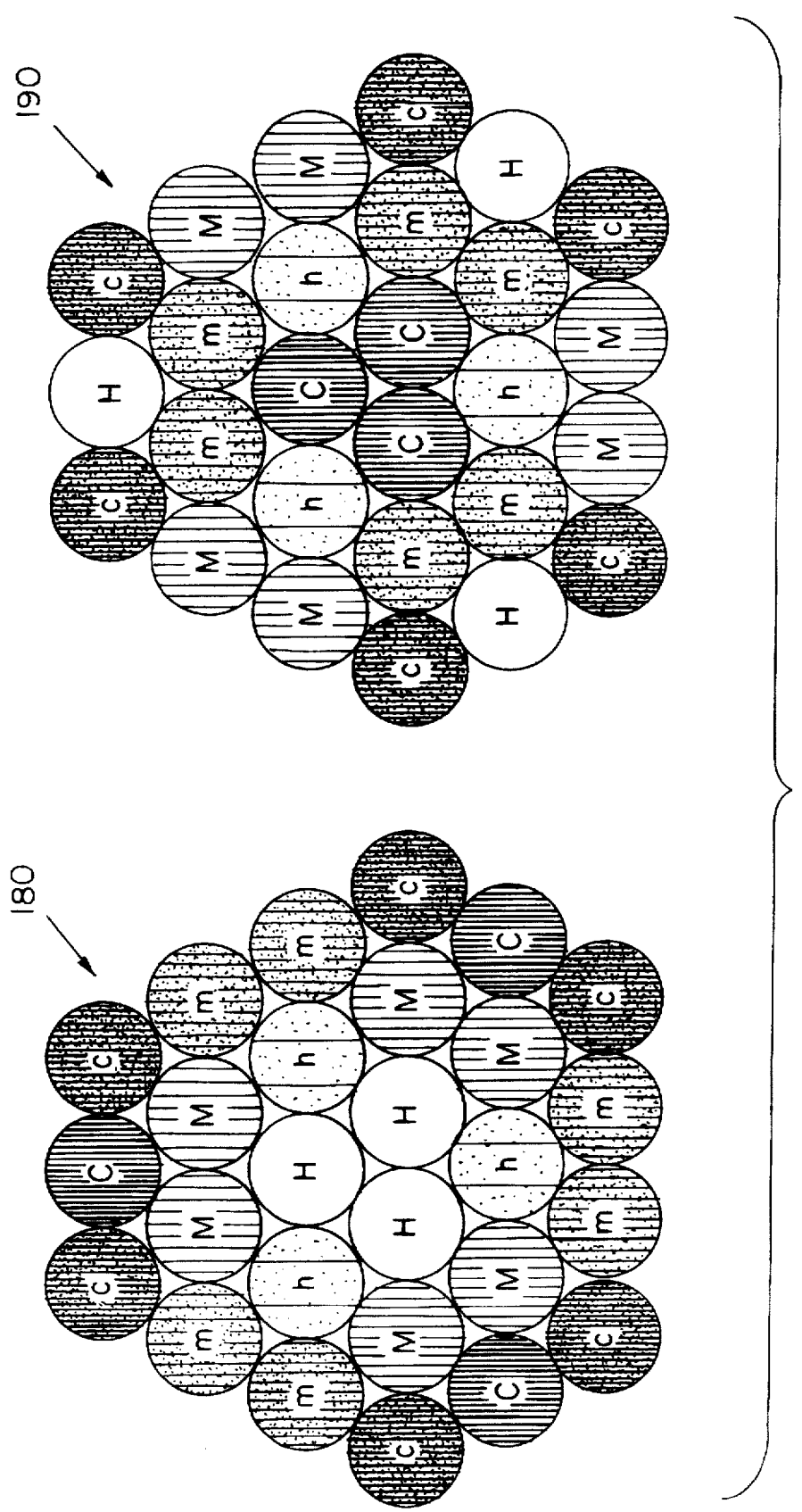
FIG. 6 is a schematic representation of a remapping order used to homogenize the beam of FIG. 5.

FIG. 6 shows a remapping order used to homogenize the beam of FIG. 5. In this embodiment, hexagonal packing of the fibers is used to optimize efficiency of the device. Grid 180 schematically depicts the positions of the input ends of the fibers, and grid 190 shows the positions of the output ends of the fibers as remapped. The relative intensity of each portion of the input beam carried by each fiber is indicated by a letter: H or h for hot, M or m for medium, and C or c for cold. Each letter represents a relative irradiance or intensity, and the letters are ordered H,h M,m C,c, in order of decreasing intensity. It will be noted from the relative intensity letters that the circularly exponential distribution is brightest at its center, and its irradiance falls off radially from the center.

Different remapping orders can be used for the same input beam irradiance profile, depending upon the desired result. For example, as previously mentioned, the remapping of FIG. 4 can be changed to use hexagonally packed fibers. Also, referring to FIG. 6, it will be noted that three hot (H) fibers are located at the center of the irradiance distribution. In an alternative embodiment, a single fiber is located at the center of the distribution.

Figure 7:
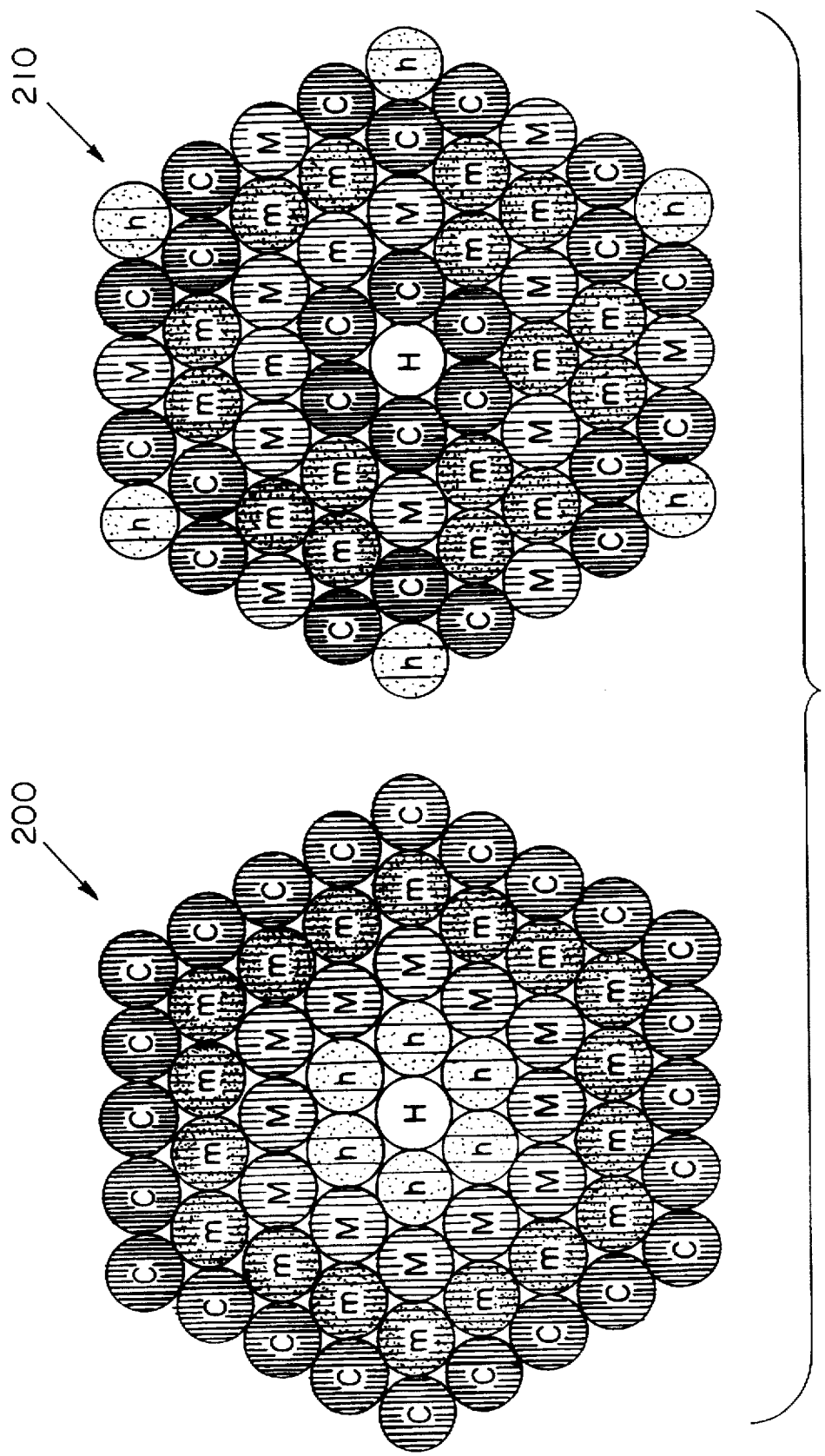
FIG. 7 is a schematic representation of an alternative remapping order used to homogenize the beam of FIG. 5.

FIG. 7 shows such an alternative remapping pattern used to homogenize the beam of FIG.5. Grid 200 schematically depicts the positions of the input ends of the fibers, and grid 210 shows the positions of the output ends of the fibers as remapped. The relative intensity of each portion of the input beam carried by each fiber is indicated by a letter H, h, M, m, C, listed in order of decreasing intensity. The fibers of this embodiment are also hexagonally packed. In this "hexapolar" remapping pattern the beam is centered upon a single central hot (H) fiber instead of three fibers as shown in FIG. 6.

While this invention has been particularly shown and described with references to preferred embodiments thereof, it will be understood by those skilled in the art that various changes in form and details may be made therein without departing from the spirit and scope of the invention as defined by the appended claims.

The invention claimed is:

1. An optical system comprising:

an input aperture for receiving an input beam of light having an input cross-sectional irradiance profile;

an output aperture coupling out of the system an output beam of light having a predetermined output cross-sectional irradiance profile; and a plurality of optical fibers between the input aperture and the output aperture each optical fiber mapping a portion of the input beam to a portion of the output beam, the plurality of optical fibers being positioned to rearrange the portions of the input beam such that the output beam has the predetermined output cross-sectional irradiance profile; and wherein the portions of the output beam are contiguous.

2. The optical system of claim 1 wherein the plurality of optical fibers map portions of the input beam to portions of the output beam to homogenize the input beam.

3. The optical system of claim 1 wherein the input beam is a laser beam.

4. The optical system of claim 1 wherein the plurality of optical fibers are hexagonally packed in a fiber bundle.

5. The optical system of claim 1 wherein the plurality of optical fibers are packed in a fiber bundle in a Cartesian array.

6. An optical system comprising:

an input aperture for receiving an input beam of light having an input cross-sectional irradiance profile;

an output aperture coupling out of the system an output beam of light having a predetermined output cross-sectional irradiance profile; and a plurality of optical fibers between the input aperture and the output aperture, each optical fiber mapping a portion of the input beam to a portion of the output beam, the plurality of optical fibers being positioned to rearrange the portions of the input beam such that the output beam has the predetermined output cross-sectional irradiance profile; and wherein the optical fibers are positioned to rearrange portions of an input beam having an exponential irradiance profile in at least one dimension.

7. An optical system comprising:

an input aperture for receiving an input beam of light having an input cross-sectional irradiance profile;

an output aperture coupling out of the system an output beam of light having a predetermined output cross-sectional irradiance profile; and a plurality of optical fibers between the input aperture and the output aperture, each optical fiber mapping a portion of the input beam to a portion of the output beam, the plurality of optical fibers being positioned to rearrange the portions of the input beam such that the output beam has the predetermined output cross-sectional irradiance profile; and wherein the optical fibers are positioned to rearrange portions of an input beam having a circularly exponential irradiance profile.

8. A system for generating a beam of light having a predetermined output cross-sectional irradiance profile comprising:

a laser source generating an input beam of light having an input cross-sectional irradiance profile;

a plurality of optical fibers having contiguous first ends and contiguous second ends, the first ends for receiving said input beam of light, the second ends being arranged to rearrange portions of the input beam so that said beam of light has said predetermined output cross-sectional irradiance profile at said second ends.

9. The system as in claim 8 further comprising:

an output aperture; and a projection condenser illumination system between the second ends of the plurality of optical fibers and the output aperture for smoothing the output cross-sectional irradiance profile.

10. A method for producing an output optical beam from a laser, the beam having a predetermined output cross-sectional irradiance profile, the method comprising:

providing an input optical beam from a laser;

determining an input cross-sectional irradiance profile of the input optical beam from the laser;

arranging a plurality of optical fibers with contiguous first ends, said fibers being arranged so that their, second ends are contiguous and so that an input optical beam of light from said laser having said input cross-sectional irradiance profile at said first ends is mapped by said optical fibers to have said output cross-sectional irradiance profile at said second ends; and irradiating said first ends with a beam of light from said laser having said input cross-sectional irradiance profile, whereby said input optical beam is formed at said second ends.

11. The method of claim 10 wherein the optical fibers are arranged such that the mapping homogenizes the input optical beam.

12. The method of claim 10 wherein the step of arranging the optical fibers comprises arranging the optical fibers in a hexagonally packed fiber bundle.

13. The method of claim 10 wherein the step of arranging the optical fibers comprises arranging the optical fibers in a cartesian packed fiber bundle.

14. The method of claim 10 further comprising coupling the output ends of the optical fibers to a projection condenser illumination system to smooth the cross-sectional irradiance profile of the output optical beam.

* * * * *